(12) United States Patent
Matsuda et al.

(10) Patent No.: US 7,828,884 B2
(45) Date of Patent: Nov. 9, 2010

(54) ENVIRONMENTALLY POLLUTION-FREE ANTI-CORROSION PIGMENT COMPOSITION

(75) Inventors: Takashi Matsuda, Tochigi (JP); Osamu Ogawa, Tochigi (JP); Toru Taki, Tochigi (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 247 days.

(21) Appl. No.: 12/257,115

(22) Filed: Oct. 23, 2008

(65) Prior Publication Data

US 2009/0078158 A1 Mar. 26, 2009

Related U.S. Application Data

(60) Division of application No. 11/531,786, filed on Sep. 14, 2006, now abandoned, which is a continuation of application No. PCT/JP02/05594, filed on Mar. 18, 2005.

(30) Foreign Application Priority Data

Mar. 18, 2004 (JP) ............................. 2004-078019

(51) Int. Cl.
C04B 9/02 (2006.01)
C09C 1/02 (2006.01)
C23F 11/00 (2006.01)

(52) U.S. Cl. .................... 106/14.12; 106/461; 106/462; 252/387

(58) Field of Classification Search ............. 106/14.12, 106/14.39, 461, 462; 252/387; 267/140.12
See application file for complete search history.

(56) References Cited

U.S. PATENT DOCUMENTS

| 4,363,884 A | 12/1982 | Ogiwara |
| 4,505,748 A | 3/1985 | Baxter |
| 5,158,610 A | 10/1992 | Bittner |
| 5,665,149 A | 9/1997 | Gotzmann et al. |
| 6,083,308 A | 7/2000 | Fletcher |
| 6,331,202 B1 | 12/2001 | Pipko |
| 6,503,305 B1 | 1/2003 | Hodges et al. |
| 7,220,297 B2 | 5/2007 | Pipko et al. |
| 2004/0168614 A1 | 9/2004 | Pipko et al. |
| 2004/0170692 A1 | 9/2004 | Day et al. |

FOREIGN PATENT DOCUMENTS

| JP | 56047458 A | 4/1981 |
| JP | 60204636 | * 10/1985 |
| JP | 03095277 A | 4/1991 |
| JP | 08283619 A | 10/1996 |
| JP | 11049975 A | 2/1999 |
| JP | 11049979 A | 2/1999 |
| JP | 2003113482 A | 4/2003 |
| WO | WO02099002 | 12/2002 |

* cited by examiner

Primary Examiner—Anthony J Green
Assistant Examiner—Pegah Parvini
(74) Attorney, Agent, or Firm—Norris McLaughlin & Marcus, PA

(57) ABSTRACT

The present invention provides an environmentally pollution-free, anti-corrosive pigment composition which is free of any heavy metal such as lead and/or chromium, which is free of zinc and/or water-soluble ions and which is excellent in the anti-corrosive effect. The anti-corrosive pigment composition comprises condensed calcium phosphate prepared by firing a mixture which comprises a calcium-containing component and a phosphorus-containing component and in which the molar ratio (Ca/P=m) of calcium to phosphorus present in these components falls within the following range: $0.50 < m < 1.00$, at a temperature ranging from 180 to 350° C.

14 Claims, No Drawings

ENVIRONMENTALLY POLLUTION-FREE ANTI-CORROSION PIGMENT COMPOSITION

This is a Divisional Application of U.S. application Ser. No. 11/531,786 filed Sep. 14, 2006 now abandoned, which is a continuation application of International application PCT/JP02/05594 filed Mar. 18, 2005, which claims priority to Japanese application JP 2004 078019 filed Mar. 18, 2004. The entire disclosures of the prior applications are hereby incorporated by reference herein in their entireties.

TECHNICAL FIELD

The present invention relates to an anti-corrosive pigment composition which can be incorporated into, for instance, anti-corrosive paints and, more particularly, to an environmentally pollution-free anti-corrosive pigment composition which is free of any heavy metal such as lead, chromium and/or zinc, which can be applied to, for instance, a variety of anti-corrosive paints and anti-corrosive oils, which has a wide variety of applications and which is excellent in the anti-corrosive effect.

BACKGROUND ARTS

Until now, as anti-corrosive pigments, there have widely been used lead-containing anti-corrosive pigments such as red lead, lead cyanamide and lead suboxide; and chromate-containing anti-corrosive pigments such as zinc chromate and strontium chromate.

These lead-containing and chromate-containing anti-corrosive pigments have excellent anti-corrosive characteristics, but the use thereof has gradually been regulated while taking into consideration, for instance, safety, hygiene, and environmental pollution. More specifically, it is apprehended that they may hurt the human health.

On the other hand, there have likewise been proposed phosphoric acid salt-containing pigments, molybdate-containing pigments, organic phosphonic acid salt-containing pigments and borate-containing pigments as environmentally pollution-free anti-corrosive pigments.

These environmentally pollution-free anti-corrosive pigments are much less problem concerning the safety and hygiene, but the anti-corrosive properties thereof are in general inferior to those observed for the lead-containing and chromate-containing anti-corrosive pigments. Furthermore, these environmentally pollution-free pigments cause various problems, for example, in that they require a high production cost and further they are deteriorated in their physical properties, dispersibility and storage stability.

These environmentally pollution-free pigments in general comprise, as the principal components, solid acids easily dissolved out and accordingly, they likewise comprise, as secondary components, solid base components in order to control any excess dissolution of such acidic components and to maintain the pH value of the resulting coated film at the neutral level. For this reason, most of the environmentally pollution-free pigments currently put on the market comprise zinc oxide as such a solid base component.

Nevertheless, it has been considered questionable whether zinc-containing compounds, in particular, zinc oxide used as a pigment component is safe or not mainly in the United States and Europe, along with the recent intensified regulation of the environmental pollution. This is because, it has been proved that zinc oxide may adversely affect the oceanic life or the marine animals and accordingly, there have been such a tendency to start self-controlling of the use of zinc oxide in the coating or painting of, for instance, containers for transporting foods, not to mention the use thereof in the places where it may have a bad influence.

In addition, when incorporating such a zinc oxide-containing anti-corrosive pigment into an oily vehicle such as boiled oil or an oily varnish, the zinc oxide reacts with the vehicle to thus cause a phenomenon or cohesion of pigment components called "seeding" and this in turn becomes a cause of a problem such as the development of insufficient appearance of the resulting coated film and the reduction of the physical properties of the same, as has been described in JIS K5621. Moreover, the coated film containing such a zinc oxide-containing anti-corrosive pigment causes a problem in that it is liable to develop white rust on a zinc-plated plate.

Thus, there have been developed environmentally pollution-free, anti-corrosive pigments, which do not contain zinc oxide at all (see, for instance, Japanese Un-Examined Patent Publication (hereunder referred to as "J.P. KOKAI") Nos. Hei 8-283619, Hei 11-049979 and 2003-113482).

However, these environmentally pollution-free, anti-corrosive pigments are still insufficient in both anti-corrosive properties and wide-spread applicability.

For instance, J.P. KOKAI 2003-113482 proposes a method for preparing an anti-corrosive pigment composition starting from precipitates obtained through a reaction of sodium tripolyphosphate with a water-soluble alkaline earth metal compound under wet conditions. However, the anti-corrosive pigment composition thus prepared never ensures the desired long-lasting anti-corrosive properties since it comprises a large amount of water-soluble ions such as $Na^+$, $NO_3^-$ and $Cl^-$.

DISCLOSURE OF THE INVENTION

The present invention has been developed while taking into consideration the foregoing existing condition of the environmentally pollution-free, anti-corrosive pigment composition and accordingly, it is an object of the present invention to provide an environmentally pollution-free anti-corrosive pigment composition which is free of any heavy metal such as lead and/or chromium, which is likewise free of zinc and/or water-soluble ions and which is excellent in the anti-corrosive effect.

The inventors of this invention have conducted various studies to achieve the foregoing object of the present invention, have found that the foregoing object can be accomplished by providing a pigment composition having the following constitution and have thus completed the present invention.

According to the present invention, there is thus provided an environmentally pollution-free, anti-corrosive pigment composition free of any heavy metal, characterized in that it comprises the condensed calcium phosphate prepared by firing a mixture which comprises a calcium-containing component and a phosphorus-containing component and in which the molar ratio (Ca/P=m) of calcium to phosphorus present in these components falls within the following range: $0.50<m<1.00$, at a temperature ranging from 180 to 350° C.

EFFECTS OF THE INVENTION

The environmentally pollution-free, anti-corrosive pigment composition according to the present invention is free of any environmental pollution since it never comprises any harmful heavy metal element such as lead and/or chromium as well as zinc and thus shows an excellent anti-corrosive effect. This anti-corrosive pigment composition can be incorporated into various kinds of resin-containing paints and therefore, it is quite useful as a pigment used in anti-corrosive paints for a variety of metal materials.

Further, the anti-corrosive pigment composition of the present invention can be used according to the methods identical to those applied to other anti-corrosive materials or in various applications similar to those for the anti-corrosive pigments, for instance, the composition of the present invention can be added to anti-corrosive oils and the composition can likewise be used in the method of using the same as an inhibitor.

MODE FOR CARRYING OUT THE INVENTION

The present invention will hereunder be described in more detail.

The detailed mechanism of the anti-corrosive action of the condensed calcium phosphate as a component of the anti-corrosive pigment composition of the present invention has not yet been clearly elucidated, but it would be considered that the condensed calcium phosphate is slightly dissolved in water under a corrosive atmosphere and it has thus a quite strong ability of chelating metals and it can form a passive film on an iron surface to thus prevent the generation of any rust.

It is essential that the condensed calcium phosphate used in the present invention is a mixture which comprises a calcium-containing component and a phosphorus-containing component and in which the molar ratio (Ca/P=m) of calcium to phosphorus present in these components falls within the following range: 0.50<m<1.00 and preferably, it is desirable to use such a mixture whose molar ratio m of calcium to phosphorus present in the mixture desirably falls within the range: 0.60<m<0.80.

This is because, if the molar ratio of calcium to phosphorus present in the mixture (Ca/P=m) falls within the range: m≦0.50, an excess of the condensed phosphate ions is dissolved out, the resulting coated film in turn undergoes blistering and results in the reduction of the anti-corrosive effect. On the other hand, if the molar ratio m falls within the range: m≧1.00, the amount of the condensed phosphate ions dissolves out, which is required for the formation of a passive film, is too low and it would be difficult to form condensed calcium phosphate.

The condensed calcium phosphate used in the present invention is desirably a compound represented by the following general formula (1):

$$Ca_xH_y(P_nO_{3n+1})_z \quad (1)$$

wherein, x represents a real number ranging from 1 to 4, y represents a real number ranging from 0 to 2, z represents a real number ranging from 1 to 2 and n is an integer ranging from 2 to 6, provided that these symbols should satisfy the following relation: $2x+y=(n+2)_z$.

In this respect, however, the condensed calcium phosphate represented by Formula (1) may include compounds each having an arbitrary number of water of crystallization.

Typical examples of the condensed calcium phosphate represented by Formula (1) include $CaH_2P_2O_7$, $Ca_2P_2O_7$, $Ca_3H_2(P_2O_7)_2$, $Ca_4H_2(P_3O_{10})_2$, and $Ca_4P_6O_{19}$, which may desirably be used alone or in the form of a mixture thereof.

The condensed calcium phosphate represented by Formula (1) may principally be analyzed according to the X-ray diffractometry and can be identified by the determination of, for instance, peaks obtained by an X-ray diffraction device.

The condensed calcium phosphate used in the present invention may be in a single crystalline state or a mixture of various kinds of crystalline states (including amorphous state).

The condensed calcium phosphate serving as a constituent of the anti-corrosive pigment composition of the present invention is desirably prepared by firing a mixture of the foregoing calcium-containing component and phosphorus-containing component at a temperature ranging from 180 to 350° C. and preferably 200 to 290° C. If the firing temperature is less than 180° C., phosphoric acid never undergoes any condensation and accordingly, any condensed calcium phosphate cannot be prepared. On the other hand, if the firing temperature exceeds 350° C., most part of the resulting condensed calcium phosphate is converted into calcium metaphosphate [$Ca(PO_3)_2$] and therefore, the resulting product is not condensed calcium phosphate having a desired anti-corrosive effect.

The time required for firing the mixture of the foregoing calcium-containing component and phosphorus-containing component is not restricted to any particular range, but it preferably falls within the range of from 1 to 30 hours. In addition, the condensed calcium phosphate obtained after the firing may optionally be subjected to a post-treatment such as pulverization and/or classification depending on, for instance, particular applications.

Examples of the phosphorus-containing components preferably used herein are ortho-phosphoric acid, polyphosphoric acid, phosphorous acid, diphosphorus pentaoxide. Moreover, examples of the calcium-containing components preferably used herein are elemental calcium, calcium oxide, calcium hydroxide, calcium carbonate, calcium mono-hydrogen phosphate, calcium dihydrogen phosphate, tricalcium phosphate, calcium pyrophosphate, and calcium dihydrogen pyrophosphate. In this connection, when using calcium nitrate, calcium acetate and calcium chloride as such calcium-containing components, there is such a tendency that water-soluble calcium ions remain in the resulting fired product and the resulting anti-corrosive pigment composition has an impaired anti-corrosive effect.

Subsequently, the inventors of this invention have searched for the solid base to be combined with the condensed calcium phosphate for the development of an environmentally pollution-free anti-corrosive pigment which is also free of any zinc component and have found that certain alkaline earth metal compounds show an excellent effect of improving the anti-corrosive properties of the resulting pigment composition. Specific examples of such alkaline earth metal compounds are, for instance, oxides, hydroxides, silicates and carbonates of, for instance, calcium, magnesium and strontium. All of these compounds ensure excellent anti-corrosive properties, but it is desirable to use, in particular, magnesium compounds.

The amount of the alkaline earth metal compound to be incorporated into the environmentally pollution-free anti-corrosive pigment composition ranges from 0 to 90% by mass and more preferably 0.1 to 60% by mass on the basis of the total mass of the pigment composition. In this case, the amount of the condensed calcium phosphate accordingly ranges from 10 to 100% by mass and more preferably 40 to 99.9% by mass on the basis of the total mass of the pigment composition. In particular, when using strongly basic oxides or hydroxides as such alkaline earth metal compounds, the amount of the compound to be incorporated into the environmentally pollution-free anti-corrosive pigment composition desirably ranges from 0.5 to 20% by mass on the basis of the total mass of the pigment composition. In this respect, these alkaline earth metal compounds may be used, in the present composition, alone or in any combination of at least two of them.

If the rate of the condensed calcium phosphate incorporated into the composition is lower than the lower limit specified above, the amount of the condensed phosphate ions dissolved out is reduced, which serves as a principal factor of the composition for the development of the desired anti-corrosive effect and accordingly, the resulting pigment composition possesses an insufficient anti-corrosive effect, while, when the rate thereof exceeds the upper limit specified above, the acidic properties of the condensed calcium phosphate in its solid state cannot be neutralized because of the corresponding reduction of the amount of the alkaline earth metal compound and consequently, the anti-corrosive effect originated from the condensed calcium phosphate is liable to be reduced.

The alkaline earth metal compound can be used after mixing the same with the condensed calcium phosphate or after further firing the mixture.

The environmentally pollution-free anti-corrosive pigment composition according to the present invention, which comprises the foregoing condensed calcium phosphate alone or a mixture of the condensed calcium phosphate with the foregoing alkaline earth metal compound, may further comprise a silicon-containing compound as an optional component. The incorporation of such a silicon-containing compound into the pigment composition would permit the fixation of any product formed through the corrosion of a basis metallic material and thus the use thereof is quite favorable for the improvement of the desired anti-corrosive effect. The silicon-containing compound is not restricted to any specific one and usable herein in general include, for instance, colloidal silica, silica products prepared according to the wet methods and the vapor phase processes, or naturally occurring minerals containing silica in the form of silicon dioxide. The amount of the silicon atom-containing compound to be incorporated into the environmentally pollution-free anti-corrosive pigment composition in general ranges from 0 to 80% by mass and preferably 0.5 to 50% by mass on the basis of the total mass of the pigment composition.

The environmentally pollution-free anti-corrosive pigment composition according to the present invention, which comprises the condensed calcium phosphate alone or a mixture of the condensed calcium phosphate with the alkaline earth metal compound, may show a satisfactory anti-corrosive effect, but the anti-corrosive effect of the pigment composition would further be improved when incorporating, into the composition, an organic phosphonic acid or carboxylic acid possessing a chelating ability and/or a neutralized salt thereof (a chelated compound), because of the synergistic effect of these components.

Examples of organic phosphonic acids having a chelating ability and used in the environmentally pollution-free anti-corrosive pigment composition according to the present invention are amino-alkylene phosphonic acids such as nitrilo-tri-methylene phosphonic acid, nitrilo-triethylene phosphonic acid, nitrilo-tri-propylene phosphonic acid and nitrilo-tris-diethyl methylene phosphonic acid; ethylenediamine-tetra-alkylene phosphonic acids such as ethylenediamine-tetra-methylene phosphonic acid, ethylenediamine-tetra-ethylene phosphonic acid and ethylenediamine-tetrapropylene phosphonic acid; alkylmethane-1-hydroxy-1,1-diphosphonic acids such as methane-1-hydroxy-1,1-diphosphonic acid, ethane-1-hydroxy-1,1-diphosphonic acid and propane-1-hydroxy-1,1-diphosphonic acid; and 2-hydroxy phosphono-acetic acid. In addition, examples of carboxylic acid possessing a chelating ability are organic carboxylic acids such as citric acid, malic acid, oxalic acid, malonic acid, succinic acid, itaconic acid, maleic acid, glycolic acid, thio-glycolic acid, salicylic acid, sulfo-salicylic acid, anthranilic acid, N-methyl-anthranilic acid, 3-amino-2-naphthoic acid, 1-amino-2-naphthoic acid, 2-amino-1-naphthoic acid, 1-aminoanthraquinone-2-carboxylic acid, tannic acid and gallic acid.

Moreover, examples of neutralized salts of these carboxylic acids are carboxylic acids partially or completely neutralized with, for instance, the alkali metals of the foregoing compounds, alkaline earth metals, aluminum and ammonium ions (including primary, secondary, tertiary and quaternary ammonium ions replaced with substituents on the nitrogen atom).

In this respect, the amount of the organic phosphonic acid or carboxylic acid possessing a chelating ability and/or a neutralized salt thereof to be incorporated into the environmentally pollution-free anti-corrosive pigment composition is not restricted to any specific range, but it in general ranges from 0 to 20% by mass and preferably 2 to 15% by mass on the basis of the total mass of the pigment composition.

The foregoing condensed calcium phosphate can be mixed with an alkaline earth metal compound, an organic phosphonic acid or a carboxylic acid possessing a chelating ability and/or a neutralized salt thereof according to either the dry mixing technique or the wet mixing technique. In particular, when the environmentally pollution-free anti-corrosive pigment composition is applied to an anti-corrosive paint and it is apprehended that the alkaline component present in the alkaline earth metal compound reacts with resins to thus cause gelation or an increase in viscosity, these components are reacted, under wet conditions, with one another in advance according to the wet mixing technique and the resulting product may be used after drying the same and then firing or pulverizing it.

The environmentally pollution-free anti-corrosive pigment composition according to the present invention may, if necessary, be subjected to a surface-treatment while taking into consideration the dispersibility of the anti-corrosive pigment particles which mainly comprise condensed calcium phosphate or the miscibility thereof with vehicles used when used as an anti-corrosive paint. The surface-treatment may be any known one ordinary used for accomplishing the foregoing purpose and specific examples of such surface-treated composition include those surface-treated with at least one member selected from the group consisting of higher fatty acids or derivatives thereof, acidic phosphoric acid esters or derivatives thereof, rhodinic acid or derivatives thereof, or silane coupling agents.

Examples of the foregoing higher fatty acids or derivatives thereof include capric acid, lauric acid, myristic acid, palmitic acid, stearic acid, oleic acid, linoleic acid, linolenic acid, or metal salts thereof or amides thereof; examples of the foregoing acidic phosphoric acid esters or derivatives thereof are monomethyl acidic phosphate, dimethyl acidic phosphate, diethyl acidic phosphate, methyl ethyl acidic phosphate, n-propyl acidic phosphate, isopropyl acidic phosphate, n-butyl acidic phosphate and isobutyl acidic phosphate; examples of the foregoing rhodinic acid or derivatives thereof are rhodinic acid, naturally occurring rosin or metal salts thereof or amides thereof; and examples of the foregoing silane coupling agents include vinyl trichloro-silane and vinyl tris(β-methoxy-ethoxy) silane.

When using the environmentally pollution-free anti-corrosive pigment composition according to the present invention by incorporating it into an anti-corrosive paint, the anti-corrosive pigment composition can be applied to not only the conventionally used solvent type paints, but also water-based paints which have attracted much attention with respect to the recent problems of environmental pollution (such as water-soluble resin-containing paints, dispersion type ones, emulsion type ones), as well as powdery paints. Binders for paints usable herein are not restricted to specific ones, may be a variety of resins and specific examples thereof include boiled oils, oily varnishes; various kinds of synthetic resins for paints such as phenolic resins, amino resins, epoxy resins, urethane resins, vinyl resins, acrylic resins, fluorine plastics, silicone resins and polyester resins; rubber derivatives such as chlorinated rubber and cyclized rubber; and other fibrin or cellulose derivatives, which may be used alone or in any combination thereof. Moreover, when the environmentally pollution-free anti-corrosive pigment composition according to the present invention is dispersed in the foregoing resin for paints, the condensed calcium phosphate, the alkaline earth metal compound, the organic phosphonic acid or carboxylic acid and/or the neutral salt thereof may be separately added to the resin for paints without mixing these component in advance and the resulting mixture is kneaded together to thus form an anti-corrosive paint, in situ, which is excellent in the anti-corrosive effect.

When the environmentally pollution-free anti-corrosive pigment composition according to the present invention is used in an anti-corrosive paint, it is desirable to used the pigment composition of the present invention alone, but the pigment composition of the present invention may be used in combination with other kinds of anti-corrosive paints.

In addition to the foregoing applications of the environmentally pollution-free anti-corrosive pigment composition according to the present invention to the anti-corrosive paints, the paint composition of the invention may likewise be used in the applications in which it serves as an inhibitor, and the applications as an anti-corrosive pigment, for instance, the addition thereof to anti-corrosive oils, the incorporation thereof into plastic products which are used together with metals in one united body and accordingly, the application of the composition is not restricted to any specific one.

EXAMPLES

The present invention will hereunder be described in more detail with reference to the following Working Examples and Comparative Examples, but the scope of the present invention is not restricted to these specific Examples and Comparative Examples at all. In the following Examples and Comparative Examples, the terms "%" and "part" used for specifying the concentrations and contents therein means "% by mass" and "part by mass", unless otherwise specified.

1. Synthesis of Condensed Calcium Phosphate A

To a flask, there were added 100 g of calcium carbonate and 173 g of commercially available 85% phosphoric acid (molar ratio: Ca/P:0.67), followed by the reaction of these substances at 80° C. for 3 hours with stirring. After allowing the reaction solution to cool, it was fired for 30 hours in a dryer maintained at a temperature of 250° C. to thus form condensed calcium phosphate A. This condensed calcium phosphate A is a mixture of, for instance, $CaH_2P_2O_7$ and $Ca_4H_2(P_3O_{10})_2$.

2. Synthesis of Condensed Calcium Phosphate B

To a flask, there were added 100 g of calcium carbonate and 154 g of commercially available 85% phosphoric acid (molar ratio: Ca/P:0.75), followed by the reaction of these substances at 80° C. for 3 hours with stirring. After allowing the reaction solution to cool, it was fired for 30 hours in a dryer maintained at a temperature of 250° C. to thus form condensed calcium phosphate B. This condensed calcium phosphate B is a mixture of, for instance, $CaH_2P_2O_7$, $Ca_3H_2(P_2O_7)_2$ and $Ca_4H_2(P_3O_{10})_2$.

3. Synthesis of Condensed Calcium Phosphate C

To a flask, there were added 100 g of calcium carbonate and 113.7 g of polyphosphoric acid (molar ratio: Ca/P:0.74), followed by the reaction of these substances at 80° C. for 3 hours with stirring. After allowing the reaction solution to cool, it was fired for 30 hours in a dryer maintained at a temperature of 230° C. to thus form condensed calcium phosphate C. This condensed calcium phosphate C is a mixture of, for instance, $Ca_2P_2O_7$ and $CaH_2P_2O_7$.

Examples 1 to 10 and Comparative Examples 1 to 6

The condensed calcium phosphates A to C prepared above, alkaline earth metal compounds, and/or organic phosphonic acids or carboxylic acids and/or neutral salts thereof were mixed together, under dry conditions, in the mixing ratios specified in the following Table 1 to thus form environmentally pollution-free, anti-corrosive pigment compositions of Examples 1 to 10, respectively.

Separately, there were admixed together, under dry conditions, calcium metaphosphate (different from condensed calcium phosphate) and magnesium oxide (Comparative Example 1); and aluminum tripolyphosphate ("K-FRESH" available from TEIKA Co., Ltd.) (aluminum tripolyphosphate corresponding to a compound represented by the foregoing Formula (1) wherein z=3) and calcium metaphosphate (Comparative Example 2), in the mixing ratios specified in the following Table 1 to thus form anti-corrosive pigments, respectively. In addition, there were used, as anti-corrosive pigments, zinc phosphate-containing aluminum tripolyphosphate ("K-WHITE AZP500" available from TEIKA Co., Ltd.) (Comparative Example 3), calcium-modified aluminum tripolyphosphate ("K-WHITE Ca650" available from TEIKA Co., Ltd.) (Comparative Example 4), zinc oxide-modified aluminum tripolyphosphate ("K-WHITE #105" available from TEIKA Co., Ltd.) (Comparative Example 5) and zinc phosphate ("ZPF" available from Sakai Chemical Industry Co., Ltd.) (Comparative Example 6). More specifically, samples used in Comparative Examples 3 to 6 were commercially available anti-corrosive pigments.

TABLE 1

Compositions of Anti-Corrosive Pigment Compositions

| Sample No. | Examples | | | | | |
|---|---|---|---|---|---|---|
| | 1 | 2 | 3 | 4 | 5 | 6 |
| Phosphoric acid salt | | | | | | |
| Condensed calcium phosphate A | 100 | 85 | 90 | | | |
| Condensed calcium phosphate B | | | | 95 | 70 | |
| Condensed calcium phosphate C | | | | | | 65 |
| Alkaline earth metal compound | | | | | | |
| Calcium oxide | | 15 | | | | |
| Magnesium oxide | | | 10 | 5 | | |
| Calcium metasilicate | | | | | 30 | 35 |

Compositions of Anti-Corrosive Pigments (or Pigment Compositions)

| Sample No. | Ex. | | | | Comp. Ex. | |
|---|---|---|---|---|---|---|
| | 7 | 8 | 9 | 10 | 1 | 2 |
| Phosphoric acid salt | | | | | | |
| Condensed calcium phosphate A | 80 | | | | | |
| Condensed calcium phosphate B | | 86 | 88 | | | |
| Condensed calcium phosphate C | | | | 97 | | |
| Calcium metaphosphate | | | | | 95 | |
| Aluminum tripolyphosphate | | | | | | 80 |

TABLE 1-continued

| Alkaline earth metal compound | | | | | |
|---|---|---|---|---|---|
| Calcium oxide | 17 | 11 | 9 | | |
| Magnesium oxide | | | | 5 | |
| Calcium metasilicate | | | | | 20 |
| Organic phosphonic acid or carboxylic acid and/or neutral salt thereof | | | | | |
| 2-Hydroxy phosphono-acetic acid | 3 | | | | |
| Citric acid | | 3 | | | |
| Calcium citrate | | | 3 | | |
| Tannic acid | | | | 3 | |

Test 1: Evaluation of Environmentally Pollution-Free, Anti-Corrosive Pigment Compositions When Using the Same in Air Drying Type Epoxy Resin-Based Paint or Coating Each of the anti-corrosive pigments prepared in Examples 1 to 10 and Comparative Examples 1 to 6 was incorporated into an epoxy resin-based paint and each resulting anti-corrosive paint was inspected for the anti-corrosive effect.

Preparation of Air Drying Type Epoxy Resin-Based Paint

There were dispersed and admixed together, 4 parts of each of the foregoing anti-corrosive pigments, 26 parts of an epoxy resin solution (available from Mitsui Petrochemical Industries, Ltd., having a xylene content of 75%), 5 parts of titanium oxide, 15 parts of talc, 25 parts of calcium carbonate, 2 parts of an anti-sagging agent, 2 parts of an anti-settling agent, one part of anti-foaming agent, 12 parts of xylene and 8 parts of isopropyl alcohol to thus prepare each corresponding base paint material. Regarding the hardener therefor, to 68 parts of polyamide resin, there was added 32 parts of xylene, followed by the sufficient mixing of these ingredients for the dissolution of the former into the latter to thus give a desired hardener. Then each paint sample was prepared by sufficiently blending 80 parts of each base paint material and 20 parts of the hardener prepared above.

Preparation of Test Plate

Each paint thus prepared was coated on a cold-rolled steel plate: JIS G3141 SPCC-SB (150×70×1.0 mm; available from Nippon TACT Co., Ltd.) using a brush in a film thickness of 40 μm as determined after drying the coated film. Then the coated film was dried at room temperature over 2 weeks.

Method of Salt Spray Test

After making a crosscut pattern, which arrived even at the surface of the basis material or the steel plate, the test plate was placed within a salt spray test device maintained at a temperature of 35° C., while the coated paint film was sprayed with a 5% aqueous sodium chloride solution at a rate of 1 kg/cm²/hour over 500 hours to thus inspect the test plate for the rust and blistering observed or generated on the flat portions of the coated film, and the width of the rust (hereunder referred to as "corrosion width") determined from the center line of the crosscut portion.

Evaluation Method and Evaluation Criteria

Both flat and crosscut portions on each coated steel plate obtained after the foregoing salt spray test procedures were inspected for the anti-corrosive effect in this salt spray test.

In respect of the flat portion, the anti-corrosive effect was evaluated on the basis of the size of the area of the portion on which rust and blistering were generated. On the other hand, the anti-corrosive effect on the crosscut portion was evaluated by determining the length of the rust and blistering from the center line of the cut portion, which was herein defined to be "corrosion width". The results of the anti-corrosive effect thus evaluated are shown in the following Table 2 according to the evaluation scores ranging from 0 to 5.

In this connection, the anti-corrosive effect on the flat portions is evaluated on the basis of the criteria according to ASTM D610-68 (1970) for the rust generation-inhibitory effect and on the basis of the criteria according to ASTM D714-59 (1965) for the blistering-inhibitory effect, respectively. As will be seen from the data listed in Table 2, the greater the score of the test sample, the higher the anti-corrosive effect.

TABLE 2

| | Flat Portion | | Crosscut Portion |
|---|---|---|---|
| Score | Rust-Generation Area | Blistered Area | Corrosion Width |
| 5 | Less than 0.03% | 0% | Less than 1 mm |
| 4 | 0.03%~less than 0.3% | 0%~less than 0.2% | 1 mm~less than 2 mm |
| 3 | 0.3%~less than 1.0% | 0.2%~less than 0.5% | 2 mm~less than 4 mm |
| 2 | 1.0%~less than 3.0% | 0.5%~less than 1.0% | 4 mm~less than 7 mm |
| 1 | 3.0%~less than 10% | 1.0%~less than 3.0% | 7 mm~less than 10 mm |
| 0 | Not less than 10% | Not less than 3.0% | Not less than 10 mm |

Results of Test 1

As will be seen from the data as shown in the following Table 3, the environmentally pollution-free anti-corrosive pigment compositions according to the present invention (Examples 1 to 10) show excellent anti-corrosive effect as compared with those observed for the anti-corrosive compositions of Comparative Examples 1 and 2 and the commercially available ones (Comparative Examples 3 to 6).

TABLE 3

| | Anti-Corrosive Effect | | |
|---|---|---|---|
| | Flat Portion | | Crosscut Portion |
| Sample No. | Rust | Blistering | Corrosion |
| Example 1 | 5 | 4 | 4 |
| Example 2 | 5 | 5 | 5 |
| Example 3 | 5 | 5 | 5 |
| Example 4 | 5 | 5 | 5 |
| Example 5 | 5 | 5 | 4 |
| Example 6 | 5 | 5 | 5 |
| Example 7 | 5 | 5 | 5 |
| Example 8 | 5 | 5 | 5 |
| Example 9 | 5 | 5 | 5 |
| Example 10 | 5 | 5 | 5 |
| Comp. Ex. 1 | 4 | 4 | 3 |
| Comp. Ex. 2 | 4 | 3 | 3 |
| Comp. Ex. 3 | 4 | 2 | 3 |
| Comp. Ex. 4 | 4 | 3 | 3 |
| Comp. Ex. 5 | 4 | 4 | 3 |
| Comp. Ex. 6 | 4 | 3 | 3 |

Test 2: Evaluation of Anti-Corrosive Pigment Compositions when Using the Same in Air Drying Type Medium Oil Alkyd Resin-Based Paint or Coating Each of the anti-corrosive pigments prepared in Examples 1 to 10 and Comparative Examples 1 to 6 according to the foregoing methods was incorporated into an alkyd resin-based paint and each resulting anti-corrosive paint was inspected for the anti-corrosive effect and the storage stability.

Preparation of Air Drying Type Medium Oil Alkyd Resin-Based Paint

There were dispersed and admixed together, 8 parts of each of the foregoing anti-corrosive pigments, 30 parts of a medium oil alkyd resin solution (TERPEN: 50%), 11 parts of talc, 40 parts of calcium carbonate, 1 parts of an anti-sagging agent, 0.5 part of an anti-skinning agent, one part of a dryer and 8.5 parts of mineral spirit to thus prepare each corresponding paint.

Preparation of Test Plate

Each paint thus prepared was coated twice on a cold-rolled steel plate: JIS G3141 SPCC-SB (10×70×1.0 mm; available from Nippon TACT Co., Ltd.) using a brush in a film thickness of 70 μm as determined after drying the coated film. Then, the coated film was dried at room temperature over 2 weeks.

Salt Spray Test and Method for Evaluation

Salt spray tests were carried out by repeating the same procedures used in the foregoing Test 1 and each test plate (both flat and crosscut portions) was inspected for the anti-corrosive effect by the salt spray test according to the same evaluation method and evaluated on the same evaluation criteria, shown in the foregoing Table 2, like Test 1.

Storage Stability Test and Method for Evaluation

Each paint prepared according to the foregoing method was introduced into a 250 ml volume mayonnaise bottle, followed by tightly stoppering the bottle, maintaining the bottle in a thermostatic chamber maintained at a temperature of 50° C. for 30 days for the evaluation of the storage stability of these paints.

The viscosity of each sample paint was determined before and after the completion of the storage stability test using a Brookfield type viscometer and further the particle size thereof was likewise determined before and after the completion of the storage stability test using a fineness gauge. Each paint was evaluated according to the following criteria: ○: The difference between the viscosities observed before and after the storage stability test is less than 10% and there was not observed any change in the particle size; x: The paint shows not less than 10% of the viscosity change (thickening) or it shows an increase of the particle size.

Results of Test 2

As will be seen from the data as shown in the following Table 4, the environmentally pollution-free anti-corrosive pigment compositions according to the present invention (Examples 1 to 10) show excellent anti-corrosive effect as compared with those observed for the anti-corrosive compositions of Comparative Examples 1 and 2 and the commercially available ones (Comparative Examples 3 to 6). In addition, with respect to the storage stability, the anti-corrosive paints of Comparative Examples 3, 5 and 6 which comprise zinc components have particularly low storage stabilities due to the occurrence of seeding, but the anti-corrosive pigments of Examples 1 to 10 which are free of any zinc component show excellent storage stabilities.

TABLE 4

| Sample No. | Anti-Corrosive Effect | | | Paint Storage Stability |
|---|---|---|---|---|
| | Flat Portion | | Crosscut Portion | |
| | Rust | Blistering | Corrosion | |
| Example 1 | 5 | 4 | 4 | ○ |
| Example 2 | 5 | 5 | 5 | ○ |
| Example 3 | 5 | 5 | 5 | ○ |
| Example 4 | 5 | 5 | 5 | ○ |
| Example 5 | 5 | 5 | 4 | ○ |
| Example 6 | 5 | 5 | 5 | ○ |
| Example 7 | 5 | 5 | 5 | ○ |
| Example 8 | 5 | 5 | 5 | ○ |
| Example 9 | 5 | 5 | 5 | ○ |
| Example 10 | 5 | 5 | 5 | ○ |
| Comp. Ex. 1 | 4 | 3 | 3 | ○ |
| Comp. Ex. 2 | 4 | 3 | 3 | ○ |
| Comp. Ex. 3 | 4 | 3 | 2 | x |
| Comp. Ex. 4 | 4 | 3 | 3 | ○ |
| Comp. Ex. 5 | 4 | 4 | 3 | x |
| Comp. Ex. 6 | 3 | 3 | 3 | x |

INDUSTRIAL APPLICABILITY

The present invention can herein provide an anti-corrosive pigment composition which is free of any environmental pollution since it never comprises any harmful heavy metal element such as lead and/or chromium as well as zinc and thus shows an excellent anti-corrosive effect. This anti-corrosive pigment composition can be incorporated into various kinds of paints and it is quite useful as an anti-corrosive material for a variety of metal materials.

Further, the anti-corrosive pigment composition can be used according to the methods identical to those applied to other anti-corrosive materials or in various applications similar to those for the anti-corrosive pigments, for instance, the composition can be added to anti-corrosive oils and the composition can likewise be used in the method of using the same as an inhibitor.

What is claimed is:

1. A method for preparing an environmentally pollution-free, anti-corrosive pigment composition which comprises condensed calcium phosphate and is free of any heavy metal, the method comprising:
   firing a mixture which comprises a calcium-containing component and a phosphorus-containing component, wherein the molar ratio (Ca/P=m) of calcium to phosphorus present in the components is within a range of 0.60<m<0.80, at a temperature ranging from 180 to 350°.

2. The method according to claim 1, wherein the condensed calcium phosphate is a compound represented by the following general formula (1):

$$Ca_xH_y(P_nO_{3n+1})_z \quad (1),$$

wherein x represents a real number ranging from 1 to 4, y represents a real number ranging from 0 to 2, z represents a real number ranging from 1 to 2 and n is an integer ranging from 2 to 6, provided that these symbols should satisfy the following relation: 2x+y=(n+2)z.

3. The method according to claim 1, wherein the condensed calcium phosphate is selected from the group consisting of $Ca_3H_2(P_2O_7)_2$, $Ca_4H_2(P_3O_{10})_2$, $Ca_4P_6O_{19}$ and a mixture thereof.

4. The method according to claim 1, wherein the calcium-containing component is selected from the group consisting of elemental calcium, calcium oxide, calcium hydroxide, calcium carbonate, calcium monohydrogen phosphate, calcium dihydrogen phosphate, tricalcium phosphate, calcium pyrophosphate and calcium dihydrogen pyrophosphate.

5. The method according to claim 1, wherein the phosphorus-containing component is selected from the group consisting of phosphoric acid, polyphosphoric acid, phosphorous acid and diphosphorus pentaoxide.

6. The method according to claim 1, wherein the mixture is fired at a temperature ranging from 200 to 290°.

7. The method according to claim 1, wherein it further comprises an alkaline earth metal compound.

8. The method according to claim 1, wherein the alkaline earth metal compound is selected from the group consisting of oxides, hydroxides, silicates, carbonates and mixtures of calcium, magnesium and strontium.

9. The method according to claim 1, wherein the alkaline earth metal compound is incorporated into the environmentally pollution-free anti-corrosive pigment composition in an amount ranging from 0.1 to 60% by mass on the basis of the total mass of the pigment composition.

10. The method according to claim 1, wherein it further comprises a chelated compound selected from the group consisting of organic phosphonic acids, carboxylic acids each possessing a chelating ability and neutralized salts thereof.

11. The method according to claim 10, wherein the organic phosphonic acid is selected from the group consisting of nitrilo-trimethylene phosphonic acid, nitrilo-triethylene phosphonic acid, nitrilo-tripropylene phosphonic acid, nitrilo-tris-diethyl methylene phosphonic acid, ethylenediamine-tetramethylene phosphonic acid, ethylenediamine-tetra- ethylene phosphonic acid, ethylenediamine-tetra-propylene phosphonic acid, methane-1-hydroxy-1,1-diphosphonic acid, ethane-1- hydroxy-1,1-diphosphonic acid, propane-1-hydroxy-1, 1-diphosphonic acid and 2-hydroxy phosphono-acetic acid.

12. The method according to claim 10, wherein the organic carboxylic acid is selected from the group consisting of citric acid, malic acid, oxalic acid, malonic acid, succinic acid, itaconic acid, maleic acid, glycolic acid, thio-glycolic acid, salicylic acid, sulfo-salicylic acid, anthranilic acid, N-methyl-anthranilic acid, 3-amino-2- naphthoic acid, 1-amino-2-naphthoic acid, 2-amino-1-naphthoic acid, 1-amino-anthraquinone-2-carboxylic acid, tannic acid and gallic acid.

13. The method according to claim 10, wherein the neutralized salt is selected from the group consisting of alkali metal salts, alkaline earth metal salts, aluminum salts and ammonium salts of the foregoing organic phosphonic acids and organic carboxylic acids.

14. The method according to claim 1, wherein the condensed calcium phosphate is surface-treated.

* * * * *

UNITED STATES PATENT AND TRADEMARK OFFICE
CERTIFICATE OF CORRECTION

PATENT NO. : 7,828,884 B2  Page 1 of 1
APPLICATION NO. : 12/257115
DATED : November 9, 2010
INVENTOR(S) : Matsuda et al.

It is certified that error appears in the above-identified patent and that said Letters Patent is hereby corrected as shown below:

Title Page, Item (60)

Related U.S. Application Data:

--PCT/JP02/05594 – should read --PCT/JP2005/005594--

Signed and Sealed this
Fourth Day of September, 2012

David J. Kappos
*Director of the United States Patent and Trademark Office*